(12) United States Patent
Seidel

(10) Patent No.: US 9,896,310 B2
(45) Date of Patent: Feb. 20, 2018

(54) LOAD-HANDLING MEANS FOR A TOWER OR A TOWER SECTION OF A WIND TURBINE AND METHOD FOR ERECTING A WIND TURBINE

(71) Applicant: Senvion GmbH, Hamburg (DE)

(72) Inventor: Marc Seidel, Osnabrück (DE)

(73) Assignee: Senvion GmbH, Hamburg (DE)

( * ) Notice: Subject to any disclaimer, the term of this patent is extended or adjusted under 35 U.S.C. 154(b) by 41 days.

(21) Appl. No.: 15/004,077

(22) Filed: Jan. 22, 2016

(65) Prior Publication Data

US 2016/0215754 A1 Jul. 28, 2016

(30) Foreign Application Priority Data

Jan. 26, 2015 (DE) .......................... 10 2015 000 787

(51) Int. Cl.
*B66C 1/10* (2006.01)
*F16F 7/10* (2006.01)
(Continued)

(52) U.S. Cl.
CPC ................ *B66C 1/10* (2013.01); *E04B 1/985* (2013.01); *E04H 12/342* (2013.01); *F03D 13/10* (2016.05); *F03D 13/20* (2016.05); *F03D 80/00* (2016.05); *F16F 7/10* (2013.01); *F16F 15/02* (2013.01); *F03D 13/40* (2016.05);
(Continued)

(58) Field of Classification Search
CPC ......... B66C 1/10; E04B 1/985; E04H 12/342; F03D 13/10; F03D 13/20; F03D 13/40; F03D 80/00; F05B 2240/912; F05B 2240/916; F05B 2260/964; F16F 7/10; F16F 15/02; Y02E 10/728
See application file for complete search history.

(56) References Cited

U.S. PATENT DOCUMENTS 4,515,525 A * 5/1985 Doman ................. F03D 7/0204
416/11
4,527,951 A * 7/1985 Trier ..................... B64C 27/001
188/378
(Continued)

FOREIGN PATENT DOCUMENTS

CN 201 306 251 Y 9/2009
EP 1 065 374 A2 1/2001
(Continued)

*Primary Examiner* — James M Ference
(74) *Attorney, Agent, or Firm* — Rankin, Hill & Clark LLP

(57) ABSTRACT

The invention relates to a load-handling means for a tower or a tower section of a wind turbine, which load-handling means has tower-attachment means for attachment to an upper end or in the region of an upper end of a tower or a tower section of a wind turbine, and attachment points for attaching at least one anchoring means of a lifting gear unit. The invention also relates to a method for erecting a wind turbine, in particular an offshore wind turbine. The load-handling means according to the invention includes at least one oscillation damper, or at least one oscillation damper is attached, in particular releasably and/or exchangeably, to the load-handling means, the damping frequency of which oscillation damper lies in the region of a natural frequency of a clamped or freestanding tower or tower section without a gondola.

14 Claims, 5 Drawing Sheets

(51) Int. Cl.
*F03D 80/00* (2016.01)
*F03D 13/20* (2016.01)
*F03D 13/10* (2016.01)
*E04B 1/98* (2006.01)
*E04H 12/34* (2006.01)
*F16F 15/02* (2006.01)
*F03D 13/40* (2016.01)

(52) U.S. Cl.
CPC ... *F05B 2240/912* (2013.01); *F05B 2240/916* (2013.01); *F05B 2260/964* (2013.01); *Y02E 10/728* (2013.01)

(56) References Cited

U.S. PATENT DOCUMENTS

| | | | | |
|---|---|---|---|---|
| 4,766,984 A * | 8/1988 | Gaffey | | F16F 7/104 188/380 |
| 5,460,099 A * | 10/1995 | Matsuhisa | | B61B 12/04 104/115 |
| 6,408,575 B1 * | 6/2002 | Yoshida | | E04H 12/34 52/123.1 |
| 6,672,837 B1 * | 1/2004 | Veldkamp | | F16F 7/10 416/144 |
| 7,343,829 B1 * | 3/2008 | Inman | | B64G 1/28 74/5.44 |
| 7,748,547 B2 * | 7/2010 | Llorente Gonzlez et al. | | B66C 23/207 212/175 |
| 7,877,934 B2 * | 2/2011 | Livingston | | B66C 23/06 52/296 |
| 7,928,593 B2 * | 4/2011 | Ollgaard | | F03D 80/00 290/44 |
| 7,980,814 B2 * | 7/2011 | Nieuwenhuizen | | E04H 12/085 415/1 |
| 8,069,634 B2 * | 12/2011 | Livingston | | F03D 13/10 52/120 |
| 8,083,212 B2 * | 12/2011 | Numajiri | | B66C 1/108 254/278 |
| 8,123,484 B2 * | 2/2012 | Choi | | F03D 80/00 416/145 |
| 8,230,660 B2 * | 7/2012 | Muhlhauser | | F03D 13/20 52/40 |
| 8,281,546 B2 * | 10/2012 | Thompson | | E04G 11/22 249/20 |
| 8,371,030 B2 * | 2/2013 | Shiraishi | | F03D 80/50 212/175 |
| 8,418,413 B2 * | 4/2013 | Marmo | | E02D 27/42 52/167.4 |
| 8,584,429 B2 * | 11/2013 | Zavitz | | E04H 12/344 52/123.1 |
| 8,823,199 B2 * | 9/2014 | Tull de Salis | | F03D 3/064 290/55 |
| 8,875,470 B2 * | 11/2014 | Heltoft | | F03D 13/10 52/121 |
| 2003/0183594 A1 * | 10/2003 | Torres Martinez | | B66C 23/207 212/196 |
| 2007/0289250 A1 * | 12/2007 | Maliszewski | | E04H 9/04 52/745.04 |
| 2007/0296220 A1 * | 12/2007 | Kristensen | | F03D 13/10 290/55 |
| 2008/0272604 A1 * | 11/2008 | Versteegh | | F03D 1/0666 290/55 |
| 2010/0314884 A1 * | 12/2010 | Ollgaard | | F03D 11/04 290/55 |
| 2011/0079678 A1 * | 4/2011 | Brenner | | B64C 27/001 244/17.13 |
| 2011/0220538 A1 * | 9/2011 | Nies | | B66C 1/108 206/525 |
| 2012/0063915 A1 * | 3/2012 | Kawabata | | F03D 80/00 416/244 R |
| 2012/0131876 A1 * | 5/2012 | Nies | | B66C 1/108 52/651.01 |
| 2012/0282095 A1 * | 11/2012 | Munk-Hansen | | F03D 11/00 416/95 |
| 2013/0011272 A1 * | 1/2013 | Mortensen | | F03D 13/10 416/244 R |
| 2013/0058070 A1 * | 3/2013 | Gaard | | H01F 27/025 361/836 |
| 2014/0030111 A1 * | 1/2014 | Kohne | | E06B 9/0638 416/244 R |
| 2014/0219812 A1 * | 8/2014 | Abolfazlian | | F03D 1/00 416/244 R |
| 2015/0316024 A1 * | 11/2015 | Larsen | | F03D 1/003 414/564 |

FOREIGN PATENT DOCUMENTS

| | | |
|---|---|---|
| EP | 2551519 A1 | 1/2013 |
| JP | H0781874 A | 3/1995 |
| JP | 2001031363 A | 2/2001 |
| KR | 101 287 140 B1 | 7/2013 |
| WO | 2008152101 A1 | 12/2008 |

* cited by examiner

LOAD-HANDLING MEANS FOR A TOWER OR A TOWER SECTION OF A WIND TURBINE AND METHOD FOR ERECTING A WIND TURBINE

BACKGROUND OF INVENTION

Field of Invention

The invention relates to a load-handling means for a tower or a tower section of a wind turbine, which load-handling means has tower-attachment means for attachment to an upper end or in the region of an upper end of a tower or a tower section of a wind turbine, and attachment points for attaching at least one anchoring means of a lifting gear unit. The invention also relates to a method for erecting a wind turbine, in particular an offshore wind turbine.

Brief Description of Related Art

Modern wind turbines comprise a high tower with a vertical longitudinal axis and frequently composed of a plurality of tower sections, at the tip of which tower a nacelle or a gondola with a rotor with a plurality of rotor blades and a horizontal rotor axis is mounted so as to be rotatable about the tower axis.

Towers of onshore wind turbines are usually erected section-wise from a plurality of sections and erected directly in situ at the construction site on a base. Tower sections for such wind turbines are usually transported in a horizontal position to the erection site. When a tower of a wind turbine is erected, the, generally multiple, individual tower sections are successively moved from their horizontal position into an upright position using a lifting gear unit and fitted onto a base, an auxiliary base or a clamping point and/or a tower section which was the last to be erected, and are connected thereto. In the process, the longitudinal axis of the tower is moved from a horizontal orientation into a vertical orientation.

In contrast, towers for offshore wind turbines are preferably erected section-wise on auxiliary bases at the port from where they are shipped. Subsequently, the towers which are completely erected, or the tower sections which are placed in a vertical position, for transportation are loaded at the port onto a wind turbine installation vessel and attached there to beam-grillage-like auxiliary bases for transportation, referred to as "grillages". For reasons of space, offshore towers are preferably transported in an upright position. The nacelle, referred to as a gondola, is not attached to the tower until after the tower has been completely erected.

Wind turbine towers are components which are very susceptible to oscillations. However, a freestanding tower without a gondola has a significantly different natural frequency than a tower with a nacelle and rotor arranged at the tip.

This means that during the erection of a wind turbine a freestanding tower without a gondola, or a tower shell, and is not yet loaded at its tip with the weight of the nacelle oscillates at a higher frequency than after the nacelle is fitted on.

Any structure, and therefore also a wind turbine or a wind turbine tower, reacts to external excitation, for example by wind or waves, at a specific frequency with natural oscillations, depending on the frequency of the excitation. In addition, any structure has what are referred to as natural frequencies. These are the frequencies at which the system oscillates if it is deflected and then left to its own devices. For wind turbines, in particular the first natural frequency is relevant, the associated first eigen mode of which is composed essentially of flexural deformation of the tower. It is therefore also referred to as the "first flexural natural frequency". The associated eigen mode is the "first flexural eigen mode". This frequency changes when further components are added, for example the wind turbine tower becomes taller. It is therefore dependent to a considerable extent on the state of construction.

Within the scope of the present invention, the term natural frequency comprises in the present context the natural frequency of a wind turbine tower per se and the natural frequency of a combination of the tower and (auxiliary) base and clamping means, that is to say essentially the natural frequency of the tower which is clamped or attached on one side.

Oscillation excitation becomes critical particularly when it is superimposed in the frequency range with the natural frequency of the structure and thereby brings about resonant oscillations which can destroy the structure.

Wind turbines are mainly excited to oscillate by the impinging wind. In completely erected turbines which are put into operation, oscillations at the tower occur in particular in reaction to the loading of the rotor by the wind. In the case of offshore wind turbines, the excitation from the movement of the sea in the form of impinging waves must also be taken into account.

The main causes of the oscillations of freestanding turbine shells are vortices, what are referred to as Karman's vortices, which bring about vortex-induced lateral oscillations ("vortex-induced vibrations"—VIV). This involves a series of vortices shared by the wind or wind field flowing around the tower alternately on the left-hand side and right-hand side of the tower viewed in the direction of the wind. The oscillation of the tower and the vortices have a mutually reinforcing effect. After the nacelle has been fitted on and the wind turbine has been put into operation, the natural frequency of the tower changes in such a way that vortex-induced vibrations are superimposed with the natural frequency of the tower at only low wind speeds and are then less critical.

Basically, the natural frequencies of the towers without a gondola are higher than in the case of completely assembled turbines. There are then conditions under which excitations by Karman's vortices induce VIVs at frequently occurring wind speeds. Correspondingly, the amplitudes of the oscillations become larger, with the result that the mechanical and structural loads acting on the wind turbine towers increase correspondingly.

Since the VIVs occur at certain wind speeds, towers of wind turbines in the shell condition without a nacelle fitted on either have to be secured above a certain length, for example by anchoring means, or measures have to be taken to prevent vortices. Otherwise, VIVs can cause the tower to be destroyed. Below a critical length, this risk does not occur, or only does so to a significantly smaller extent, since the natural frequencies of the relatively short tower stumps with a smaller number of tower sections lie in a relatively high frequency range, and the high wind speeds which are associated with said frequencies do not have to be anticipated in reality.

The critical wind speed at which vortex-induced lateral oscillations are dangerous for the tower shell, is usually between 10 m/s and 25 m/s for a completely erected tower without a gondola, depending on the height and rigidity of the tower, for which reason erection is not permitted if these wind speeds are expected and the gondola cannot be pulled up directly after the lifting of the last tower length.

When erecting a wind turbine, this fact is allowed for in that, during the erection of a wind turbine with a tower composed of a plurality of sections the last section or, if appropriate, the last sections of the tower and of the nacelle are installed or fitted onto the tower in a weather window with calm weather, preferably at wind speeds of at maximum 9 m/s. Such weather windows must last for at least several hours or days. Therefore, waiting for a suitable weather window can considerably delay the erection of a wind turbine, and as a result incur high costs.

The consequences of the oscillation problem are more pronounced offshore than onshore. In contrast to the section-wise erection of onshore towers, offshore towers are, as a rule, already assembled at the port from a plurality of tower sections with a vertically positioned longitudinal axis, and for reasons of space are preferably transported in an upright position on a wind turbine installation vessel. During transportation, the towers or tower sections are subjected to excitation by wind and waves. VIVs can already occur at this point. Furthermore, the weather windows which are suitable for erection are shorter offshore owing to generally more continuous and higher wind speeds, with the result that, as a rule, it is necessary to wait longer for a weather window which is suitable for erection than onshore, which is in turn associated with correspondingly high additional costs for the offshore construction site.

During transportation on a wind turbine installation vessel, there is also the factor that the dynamic wind can additionally amplify the wind which is present in any case, such that even stronger VIVs can occur. Furthermore, a tower or a tower section can additionally be excited to oscillate by rolling movements of the vessel which are caused by the swell of the sea. Wind turbine installation vessels are usually not equipped with their own liquid rolling movement damper which would damp these rolling movements, since the loading with the vertical towers or tower sections would shift the rolling frequency in such a way that such a damper can have little effect. The rolling movement also brings about a certain amount of air flow at the tips of the towers or tower sections.

At present, the towers of the offshore wind turbines are, as a rule, transported in two pre-assembled sections which are subsequently fitted successively onto the foundation structure or onto the lower tower section in two lifting operations and connected. As a result of the divided transportation of the tower, the critical wind speeds for excitation by VIVs are so high for the lower section that they do not occur to a critical extent.

However, if complete towers are to be installed in order to shorten the time for offshore work, the critical wind speeds owing to the increased tower height are then below 20 m/s and can therefore realistically occur. In this case, measures to counteract VIVs must be urgently taken.

Since towers for offshore wind turbines are, as a rule, pre-installed at the port to form an upright tower shell and/or transported in an upright position on an installation vessel, owing to VIVs above a certain length they have hitherto either been secured by bracing means, or coils are attached in the upper tower region in order to prevent vortices, such as is known, for example, in WO 2006/106162 A2. However, the practicable use of coils requires compliance with specific criteria relating to the thickness of the coils and the gradient of the winding. The expenditure on the installation and de-installation of these coils offshore is considerable.

BRIEF SUMMARY OF THE INVENTION

Taking this prior art as a basis, the present invention is therefore based on the object of making the transportation and the erection of wind turbine towers, in particular offshore, more efficient and, in particular, less dependent on the weather.

This object on which the invention is based is achieved by means of a load-handling means for a tower or a tower section of a wind turbine, which load-handling means has tower-attachment means for attachment to an upper end or in the region of an upper end of a tower or a tower section of a wind turbine, and attachment points for attaching at least one anchoring means of a lifting gear unit, which is further developed in that the load-handling means comprises at least one oscillation damper, or at least one oscillation damper is attached, in particular releasably and/or exchangeably, to the load-handling means, the damping frequency of which oscillation damper lies in the region of a natural frequency of a clamped or freestanding tower or tower section without a gondola.

With respect to the definition of terms within the scope of the present application, a differentiation is made between the lifting gear unit and load-handling devices. Equipment for lifting and moving loads is referred to as lifting gear. This includes, inter alia, cranes, but also elevator systems, heavers, lifting platforms, lifting bridges, chain hoists, jibs, cable pull, etc.

Load-handling devices form a connecting element between the lifting gear, for example a crane, and the material to be transported. The term load-handling device subsumes the terms load-bearing means, anchoring means and load-handling means. The load-bearing means is permanently connected to the lifting gear, for example crane, for example crane hooks and grips or cross-members which are securely reeved. Anchoring means are not part of the lifting gear. They are, for example, endless cables, lifting belts, hook-ended chain slings, suspension gear and releasable connecting components such as, for example, shackles.

Finally, the load-handling means are not part of the lifting gear either and serve as a type of adapter between materials to be transported, which do not have their own anchoring points or attachment points for anchoring means or load-bearing means, and the anchoring means or load-bearing means. Load-handling means are, for example, in simple cases hooks, sockets, grippers, but also load-lifting magnets or vacuum lifters. In the case according to the invention of large materials to be transported, the term load-handling means includes, for example, cross-members, spreaders, crossed cross-members or similar elements which are designed, on the one hand, for attachment to the upper side or the upper edge of a tower section or a tower of a wind turbine and, on the other hand, have attachment points or anchoring points for anchoring means or load-bearing means of a crane.

When wind turbines or their towers are erected, an anchoring means, for example a cable suspension gear or a structure with hook chains is also customarily used between the load-bearing means of the crane which is employed and the load-handling means.

The invention is based on the basic concept of integrating an oscillation damper into the load-handling means for the tower in a fixed or releasable or exchangeable fashion. This does not increase the number of necessary lifting movements, i.e. the time required for the lifting movements remains unchanged. The slightly increased weight of the load-handling means, generally not more than 10 t, is not a significant factor with respect to the weight of the wind turbine tower. The oscillation damper is configured here in such a way that it covers the expected frequency range of the natural frequency for the respective tower or the respective tower section, or in an optimum case for all the expected towers. In this context, it is also necessary to take into account the type of clamping in or of transportation, for example, the upright transportation on a wind turbine installation.

Within the scope of the invention, the feature of a "freestanding" tower without a gondola or a "freestanding" tower section without a gondola includes any type of vertical positioning, i.e. also the tower or tower section which is standing on an auxiliary base and/or on a sea-going vessel. Clamping in generally prevents a tower or a tower section from tipping over during transportation, but does not prevent oscillations of the tower.

Energy which is input into an oscillation of an oscillating mass which is suspended movably with respect to the tower or mounted in an oscillating fashion is extracted from the oscillation of the tower by an oscillation damper. The oscillating mast can be, for example, a pendulum mass, a mass which is suspended from springs or a liquid. The oscillation of the oscillating mass ideally has a phase shift of 180° with respect to the oscillation of the tower itself at a specific frequency, which corresponds, or is close, to a natural frequency of a tower, of a tower stump or of a tower section. The maximum oscillation energy is therefore diverted from the tower into the oscillation damper, which brings about maximum damping of the oscillation of the tower. Above or below the frequency of maximum damping, the phase shift is more or less than 180°, and the damping effect therefore decreases.

The invention can be applied both in towers which are to be erected in the complete state as well as in towers which are erected from individual towers sections or from a plurality of tower sections which have previously been connected to one another. The following statements therefore apply in the same way to towers as well as to tower sections which are connected to the load-handling means according to the invention.

If the oscillation damper can be integrated in a releasable or exchangeable fashion into the load-handling means, it is possible, for example, to keep available a relatively large number of load-handling means which are designed to hold an oscillation damper, and to keep available a relatively small number of oscillation dampers. For example, in the case of offshore wind turbines, the tower sections or towers which are to be installed can then already be equipped at the port with the load-handling means, which are then only equipped with an oscillation damper in situ on the wind turbine installation vessel or on a wind turbine installation platform.

The damper is integrated into an existing system, since the erection of wind turbine towers has already been carried out for a long time using large cranes whose anchoring means are fastened to a load-handling means which is connected to the upper side of the tower which is to be placed in an upright position or raised or the tower section which is to be placed in an upright position or raised. The accustomed sequences are therefore not modified according to the invention.

With the inclusion of an oscillation damper in the load-handling means for the tower or for the tower section, an element which is already customarily used is provided with a new function, specifically oscillation damping of a freestanding wind turbine tower without a gondola. The load-handling means is arranged for functional reasons at the tip of the tower and is therefore in the ideal position for the arrangement of an oscillation damper which can damp oscillations at the natural frequency of the tower. The load-handling means according to the invention therefore remains at the tip of the erected tower until a wind turbine gondola or a nacelle is fitted onto the tower. Even if the nacelle cannot be fitted on without delay owing to a sudden change in the weather, the tower can remain in the upright position with the damper integrated into the load-handling means without a risk of damage by VIVs.

The release and removal of the load-handling means is a method step which is already present in conventional methods and conventional load-handling means for wind turbine towers, and which therefore does not require any additional time. Since the dependence on suitable weather windows is reduced, this gives rise to greater flexibility of the process in terms of timing. In the event of unfavorable weather, it is therefore possible to carry out other processes in parallel, for example erection of other towers in an offshore wind park by transferring a wind turbine installation vessel. In this way, it is possible to eliminate the limitation on the complete erection of an individual wind turbine of a wind turbine park in bad weather, which hinders all other work. Therefore, even comparatively short weather windows can be used to erect, for example, only the tower. The turbine can then be left in the construction state with the load-handling means and oscillation damper fitted, and the erection process can be continued when the weather conditions are suitable.

The oscillation damper is preferably embodied as a tuned liquid sloshing damper, as a tuned liquid column damper (TLCD), as a pendulum damper with or without viscous liquid or as a spring-mass damper or comprises a plurality of oscillation dampers of the same type or of different types.

The liquid damper, that is to say the tuned liquid sloshing damper and the tuned liquid column damper (TLCD) are each preferably of closed design, since the oscillation damper is tilted with the load-handling means in order to connect said damper to a tower in a horizontal position or a tower section in a horizontal position. A TLCD requires less mass and water compared to a tuned liquid sloshing damper whose damping-relevant parts are composed essentially of a trough with a liquid, for example salt water, since the entire water column oscillates in a tube which is bent essentially in a U shape and said water column reaches a greater oscillation amplitude than in the tuned liquid sloshing damper. However, a tuned liquid sloshing damper also has a smaller overall height than a TLCD, which is advantageous when there are restricted space conditions in the load-handling means.

In one advantageous development there is provision that a plurality of oscillation dampers, in particular a plurality of oscillation dampers with different damping frequencies, are provided. This selection of different damping frequencies of a plurality of oscillation dampers permits broadband damping of oscillations of the freestanding tower or tower shell without a gondola. As a result, the range of wind energy speeds at which VIVs are damped is simultaneously increased. Therefore, the weather conditions in which the towers can be freestanding without a gondola are widened, with the result that the intervals between the erection of the tower and the fitting on and mounting of a nacelle can be lengthened without further safety measures which would delay the erection of further wind turbines being necessary.

The damping frequency or damping frequencies of the oscillation damper or of the oscillation dampers lie advantageously between 0.2 and 1.5 Hz, in particular between 0.5 and 1.0 Hz. This range is essentially above the range of the typical natural frequencies of completed wind turbines. In that case, the frequencies of the natural oscillations in offshore wind turbines are often below 0.3 Hz.

The load-handling means preferably comprises a cross-member, a cross-member intersection or a, in particular, round or square plate with adapter elements which can be mounted on various towers or tower sections.

A spreader is advantageously included in the load-handling means. A spreader serves to spread out the anchoring means, that is to say for example a bundle of chains or cables which run together at a central point and which can be guided essentially in parallel below the spreader. The spreader therefore absorbs radially inwardly acting forces which occur as a result of gravity acting on the otherwise obliquely hanging anchoring means, in particular chains or cables, and would, under certain circumstances, load the tower, which has a round cross section. The spreader also relieves the loading on the part of the load-handling means which is connected to the tower or tower section.

In order to be able to secure various towers or tower sections in different construction states and/or transportation states, a natural frequency of the at least one oscillation damper can advantageously be adapted to various construction states, transportation states, towers and/or tower sections. This means that the oscillation damper is or can be detuned by, for example, installation parts, for example bulkhead plates in tuned liquid sloshing dampers, additional springs in mass-spring dampers, etc. This measure is also useful in order, for example, to counteract different excitation spectrums during the transportation and during and after the erection of offshore carrying structures. Appropriate measures for various types of dampers can also be found in the German patent application DE 10 2015 000 788.2 entitled "Verfahren zum Errichten einer Windenergieanlage and Windenergieanlage [Method for erecting a wind turbine and wind turbine]" by the applicant, which patent application has the same application date as the present patent application.

In order to adapt the natural oscillation frequency of the at least one oscillation damper, a coherent tuned liquid sloshing volume is preferably modified in a tuned liquid sloshing damper, in particular by inserting or removing bulkhead plates, wherein in order to increase the sloshing volume, one or more, in particular all, of the bulkhead plates are removed from guide rails in an overall volume of the tuned liquid sloshing damper, with the result that in each case a relatively large sloshing chamber is produced from a plurality of small sloshing chambers. In small sloshing volumes, also referred to as sloshing chambers or sloshing basins, the liquid oscillates more quickly, and when the sloshing volume is made larger the oscillation frequency is correspondingly higher. An air spring effect of an air column above the liquid in at least one riser pipe of the oscillation damper is also advantageously decreased or increased, in particular by opening or closing a valve or a shutoff valve, in order to adapt the natural oscillation frequency of the at least one damper in a tuned liquid column damper with two riser pipes.

In the event of a spring-mass damper or a pendulum damper being used in combination with springs on the pendulum mass, there is preferably provision that the number of springs is changed and/or springs which are used are replaced by springs with a smaller or stronger spring force, in order to adapt the natural oscillation frequency of the at least one damper. Furthermore, a pendulum damper with viscous damping can also be used. In the case of a pendulum damper, in order to adapt the natural oscillation frequency of the at least one damper the pendulum length is preferably increased or decreased, wherein the pendulum length is set, in particular, by bending on carriers which are arranged on the tower wall, or by securing chain elements.

The oscillation damper is advantageously arranged, in particular, in an exchangeable fashion, between an upper lifting frame and a lower lifting frame or alternatively connected in a fixed fashion to a single lifting frame. In the first alternative, the upper and lower lifting frames can also be connected all around to one another at a plurality of locations. The lower and upper lifting frames therefore form a frame and a bearing for the oscillation damper or dampers, and can advantageously be combined with one another in an exchangeable fashion. In the second alternative, the arrangement only has a single lifting frame on which the oscillation damper is arranged.

A housing of the oscillation damper or of the oscillation dampers is advantageously a load-bearing part of the load-handling means, as a result of which it is possible to reduce the weight of the load-handling means.

Tower sections are frequently transported with a transportation frame and are also erected or placed in an upright position section-wise with the transportation frame. In these cases, the transportation frame is not removed until after the erection or placing in the upright position, and the load-handling means, which can carry the tower sections mounted one on top of the other in the complete state and according to the invention comprises the damper, is fitted on. The lower lifting frame is therefore advantageously embodied as a transportation frame on which the upper lifting frame with the oscillation damper can be fitted and attached, in order to form the entire load-handling means according to the invention.

In a first advantageous variant, the upper lifting frame has attachment points for an anchoring means. The upper lifting frame therefore has the function of transmitting the weight force of the tower to the anchoring means and the lifting gear and also of carrying the damper and the lower lifting frame.

Alternatively it is also advantageously possible for the upper lever means to have anchoring points, and the lower lever means to have attachment points for an anchoring means. In this case, the anchoring points of the upper lever means merely form guides for the anchoring means, which is otherwise attached to the attachment points on the lower lever means. Therefore in this case the lower lifting frame supports the tower and the damper and passes on the weight of the tower to the anchoring means and the lifting gear and the load-bearing means thereof.

In one advantageous development, the anchoring points and the attachment points are arranged offset with respect to one another. This means that between the upper lifting frame and the lower lifting frame the individual runs of the anchoring means, for example the chain parts or cable parts, are not arranged straight downward (in the state in which the tower is placed in the upright position) or in the direction of the tower axis but rather are also arranged in such a way as to absorb lateral forces by virtue of their oblique guidance. As a result, stable securement of the tower or of the tower section which is suspended from the lifting gear unit is achieved.

Since the tower which is erected in this way or the tower section which is erected in this way can, under certain circumstances, be in an upright position without a nacelle even for a relatively long period of time, in one advantageous development there is provision that at least part of the load-handling means is embodied as a cover for the tower or the tower section and has, in particular, at least one tower hatch for access to the interior of the tower or the tower section. The tower or the tower section is therefore protected against rain and the interior of the tower or the tower section is still accessible to maintenance personnel or construction personnel.

The object on which the invention is based is also achieved by means of a method for erecting a wind turbine, in particular an offshore wind turbine, comprising the following method steps:
a) a tower or a tower section is connected at its upper end with respect to the upright state to a load-handling means;
b) an anchoring means of a lifting gear unit is connected to the load-handling means;
c) the tower or the tower section is placed in an upright position and/or raised;
d) if appropriate, in the case of a tower composed of a plurality of tower sections the tower sections are successively placed one on top of the other and connected to one another to form the tower;
e) the load-handling means is removed in the upright state of the tower or of the tower section; and
f) after the removal of the load-handling means from the completely erected tower, a wind turbine gondola is fitted onto the tower;
wherein the method is further developed according to the invention in that in the upright state of the tower and/or of the tower sections, the oscillations of the tower or of the tower sections are damped by one or more oscillation dampers in or on the load-handling means.

The "upper end" from method step a) is located at the top in the completely erected state with a vertical longitudinal tower axis, that is to say in the direction of the nacelle.

The method step d) is omitted when an entire tower is erected in one lifting movement. The method steps e) and f) are delayed if the nacelle cannot be mounted immediately subsequent to the erection of the tower (for example owing to a change in the weather).

As a result, as described above, it becomes possible to allow the tower or the tower section, once it has been erected, to be in a freestanding state even without a gondola over a relatively long period of time, since the structural stability is sufficient even in the case of strong wind or bad weather conditions. This makes it possible to improve the sequences during the erection of wind turbines both onshore and offshore and to erect a relatively large number of wind turbines in parallel in a relatively short time.

The load-handling means is advantageously already connected to the tower or the tower section before transportation, in particular shipping, of the tower or of the tower section.

Likewise, the tower is preferably already assembled from two or more tower sections before transportation, in particular shipping and connected according to the invention to a load-handling means, such as is described above.

A natural frequency of the at least one oscillation damper is advantageously adapted to various transportation states, construction states, towers and/or tower sections, for example by means of construction means such as the use of bulkhead plates in tuned liquid sloshing dampers, changing the spring strengths in mass-spring dampers and the like. This measure is advantageous, in addition to the changed natural frequency of the tower in various construction states, inter alia, in the event of different excitations, for example as a result of the swell of the sea, being expected during transportation and when the offshore load-bearing structure is erected in the completed state.

The same advantages, properties and features are implemented with the method according to the invention as with the load-handling means according to the invention.

Other features of the invention are apparent from the description of embodiments according to the invention together with the claims and the appended drawings. Embodiments according to the invention can implement individual features or a combination of a plurality of features.

BRIEF DESCRIPTION OF THE DRAWINGS

The invention will be described below by means of exemplary embodiments and with reference to the drawings without restriction of the general inventive concept, wherein reference is made expressly to the drawings with respect to all the details according to the invention which are not explained in more detail in the text. In the drawings.

In the drawings, identical or similar elements and/or parts are respectively provided with the same reference numbers, and therefore they are not presented again in each case.

DETAILED DESCRIPTION OF THE INVENTION

Figure 1:
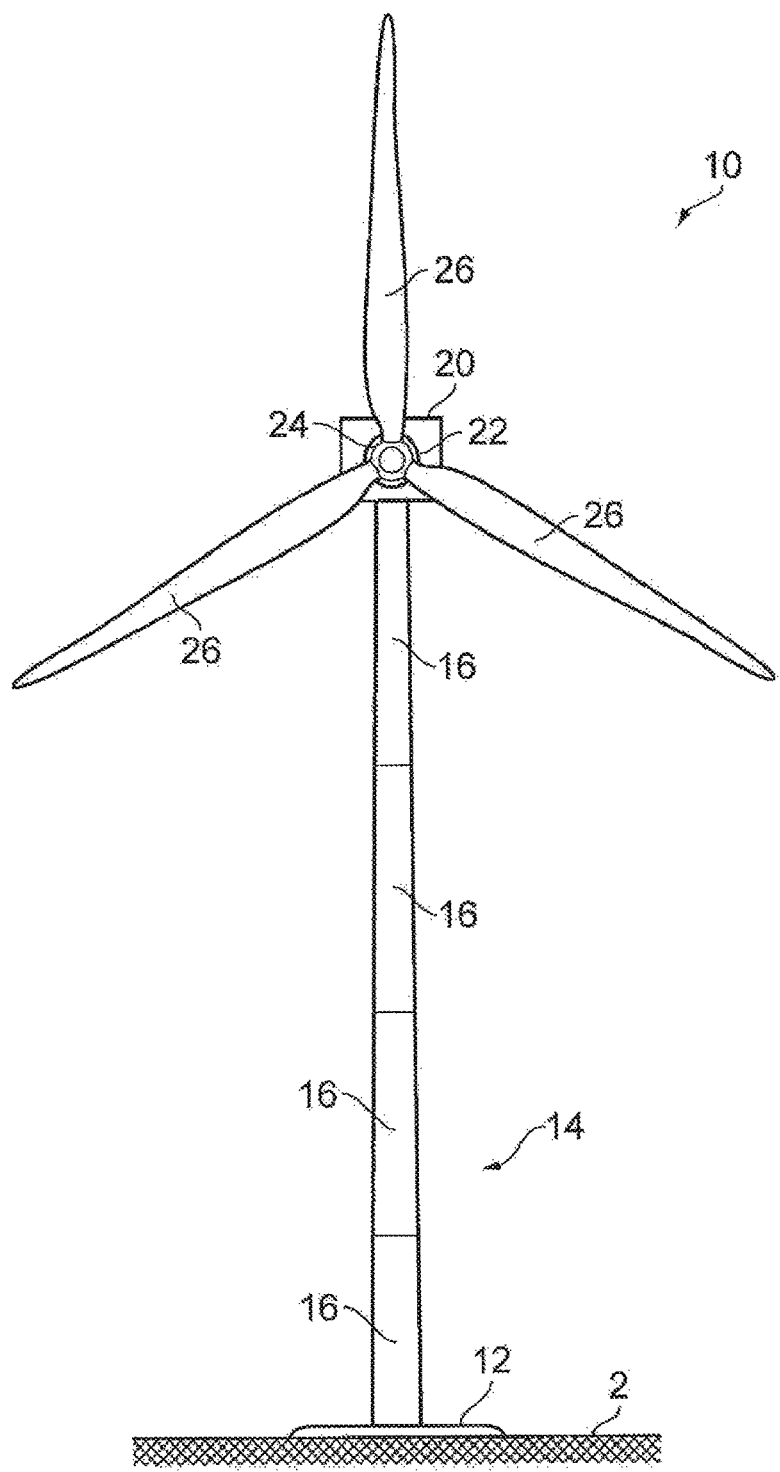
FIG. 1 shows a schematic illustration of a wind turbine.

FIG. 1 shows a wind turbine 10 of the generic type, in this case an onshore wind turbine which is positioned upright on a base 2. In the case of offshore wind turbines, the base 2 is underwater, with the result that a substructure is present which is anchored in the base 2 and ends above the water level. A tower 14 is then erected on this substructure.

In the case of the onshore wind turbine shown in FIG. 1, the superficial part of a foundation 12 or of a base can be seen on the base 2 on which a tower 14 with four tower sections is erected. The tower 14 can taper upward, have a constant diameter or else bending points in the contour, i.e. so that the tower is designed in such a way that after a taper in the lower region it widens in an upward direction in the upper region. A nacelle 20 is arranged at the tip of the tower 14, wherein FIG. 1 shows a front view of a wind turbine 10 with a rotor which has a rotor hub 22 with a cover, also referred to as a spinner 24, and three rotor blades 26.

The erection of such a wind turbine 10 will be explained by way of example in the following FIGS. 2 and 3. A crane is not illustrated in FIGS. 2 and 3 for the sake of clarity.

Figure 2:
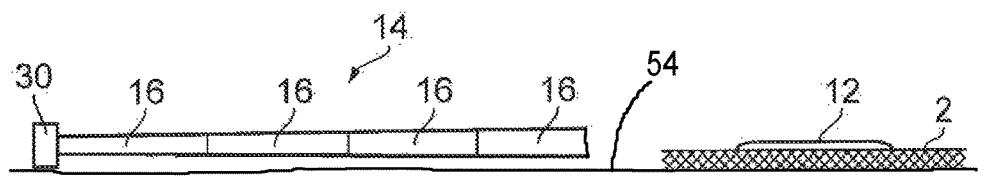
FIG. 2 shows a schematic illustration of a tower of a wind turbine in a horizontal position.

FIG. 2 illustrates a tower 14 with the four tower sections 16 in a horizontal position on an onshore surface 54 in the vicinity of the foundation 12 for the wind turbine. A load handling means 30, which supports the tower 14 in its circular cross section and has attachment points for anchoring means of a crane or hoist, is already arranged at the tip of said tower 14.

The tower sections 16 are, in contrast to the schematically simplified view in FIG. 2, preferably placed individually in an upright position with a vertical longitudinal axis and mounted one on top of the other. In this case, the load-handling means merely supports the top tower section in the horizontal position. Conventional load-handling means or anchoring means, composed, for example, from an anchoring block, shackles and lifting belts, can also be used to place the individual tower sections 16 in an upright position and fit them one on top of the other. The load-handling means 30 would then merely be used for lifting the complete tower 14 or the topmost tower section 16 and would remain at the tip of the tower 14 until the tower is erected.

Figures 3A, 3B, 3C:
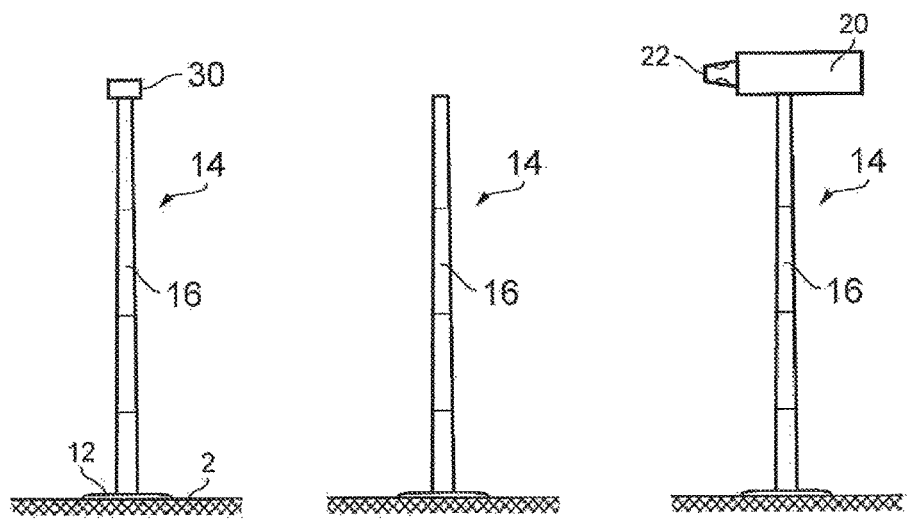
FIGS. 3a) to c) show successive steps during the erection of a wind turbine.

FIG. 3A shows that the tower 14 with the load-handling means 30 at its tip is mounted completely on the foundation 12. The load-handling means 30 remains for the time being at the tip of the tower 14. Since the load-handling means is a load-handling means 30 according to the invention with an oscillation damper (not illustrated), the tower without a gondola in FIG. 3A can remain in an upright position essentially without danger. Immediate completion by fitting on a gondola or a nacelle is not necessary in this case. The situation with offshore wind turbines is essentially the same as that for the onshore wind turbine 10 shown in FIGS. 2 and 3. When the load-handling means 30 according to the invention is used in conjunction with the erection of offshore wind turbines, the assembled towers can be stored at the base port in the upright position and with the load-handling means 30 fitted.

Instead of the erection of the tower 14 in one operation, as illustrated in FIGS. 2 and 3, the individual tower section 16 can also be placed in an upright position and mounted one on top of the other successively within the scope of the invention, with the result that the tower 14 of the wind turbine 10 is assembled and completed in a plurality of lifting movements.

In FIG. 3B, the load-handling means 30 has been removed in preparation for the fitting on of a nacelle 20. In this state, the tower 14 is sensitive to wind-induced lateral VIV oscillations, with the result that only a short time window remains for the fitting on of the nacelle 20. This has already taken place in the situation illustrated in FIG. 3C. Here, as a result of the very heavy nacelle 20 with the rotor hub 22 the natural frequency of the wind turbine has been shifted in such a way that under realistically occurring conditions it is outside the frequency range of VIVs. The rotor blades themselves have not yet been mounted.

Figure 4:
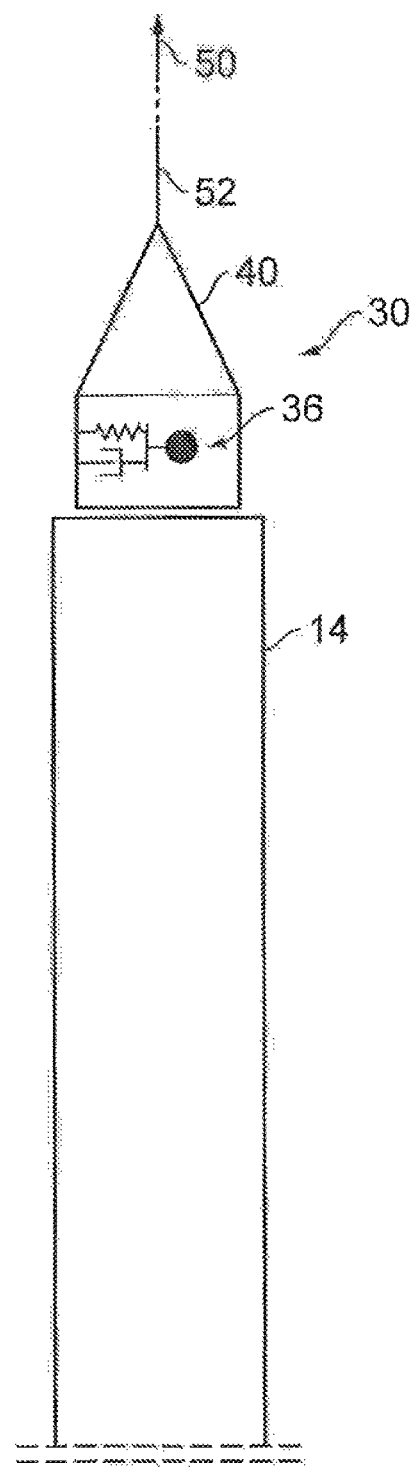
FIG. 4 shows a schematic illustration of a load-handling means according to the invention.

FIG. 4 shows a first exemplary embodiment of a load-handling means 30 according to the invention in a schematic overview. The load-handling means 30 is attached to an anchoring means 40 which is itself connected to the load-bearing means 52 of a lifting gear unit 50 (only indicated), for example a crane. On its underside, the load-handling means 30 is connected to a tower 14, suspended therefrom, of a wind turbine. The tower is illustrated only with its upper part.

The load-handling means 30 comprises an oscillation damper which is embodied as a spring-mass damper and the schematically indicated components of which are described in the following figures. The oscillation damper 36 damps VIVs of the tower 14, in particular in the frequency range of the first tower bending torque.

Figure 5A:
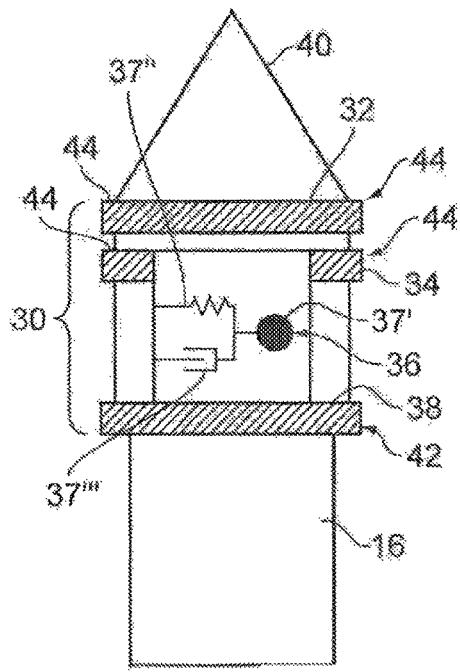
FIGS. 5A and 5B each show a further schematic illustration of a detail of a load-handling means according to the invention.

FIG. 5A is an enlarged illustration of a detail from FIG. 4. The curly bracket with the reference number 30 indicates the elements of the load-handling means 30 which are associated with this exemplary embodiment. These are a spreader 32 which is arranged at the top, an upper lifting frame 34, the oscillation damper 36 which has already been presented in FIG. 4 and is embodied as a spring-mass damper, and a lower lifting frame 38. The oscillation damper 36 is arranged between the upper lifting frame 34 and the lower lifting frame 38, wherein the lower lifting frame 38 is also connected to the upper edge or the upper region of a tower section 16, or of a tower 14.

The spring-mass damper comprises an oscillating mass 37' which is suspended from springs 37''. Furthermore, a viscous damping element 37''' is provided which damps the oscillation of the mass 37'. The damping frequency of the oscillation damper 36 can, given a definitively selected mass 37', be selected and/or adapted by the selection of the spring strength and/or number of springs 37'' and by the extent of damping by the damping element 37''', with the result that the damping frequency of the oscillation damper 36 can, for example, be adapted for various construction stages of the tower shell or for various tower sections.

An anchoring cable or an anchoring chain with two harness elements which run together at an upper point. At the upper point at which the individual cables or chains run together, the anchoring means 40 is for example anchored or attached to a crane hook (not illustrated). The individual cables or chains of the anchoring means 40 run through anchoring points 44 in the spreader 32 and in the upper lifting frame 34 and continue to attachment points 42 in the lower lifting frame 38. In this case, the weight of the tower section 16 is applied to the anchoring means 40 at the attachment points 42 in the lower lifting frame 38. The oscillation damper 36 and the upper lifting frame 34 rest on the lower lifting frame 38 which additionally bears their weight and applies it to the anchoring means 40.

The spreader 32 can either be spaced apart from the upper lifting frame 34 with spacing elements or can be attached at specific locations on the anchoring means 40.

Figure 5B:
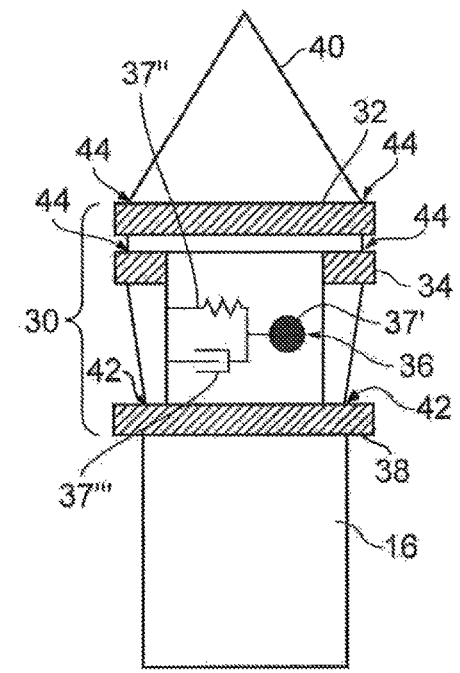

The anchoring points 44, on the one hand, and the attachment points 42, on the other, are advantageously offset with respect to one another (e.g., as shown in FIG. 5B), with the result that anchoring means 40 between the spreader 32 or the upper lifting frame 34, on the one hand, and the lower lifting frame 38, on the other, do not run straight downward in the direction of gravity if the tower has already been placed in an upright position and raised, but rather obliquely with respect thereto. Therefore, lateral forces which act on the tower 14 or the tower section 16 are absorbed better, since they are transformed into tensile stress of the anchoring means 40. These lateral forces are damped better than bending loading, since the anchoring means are usually very pliable with respect to bending and do not damp bending.

Figure 6A:
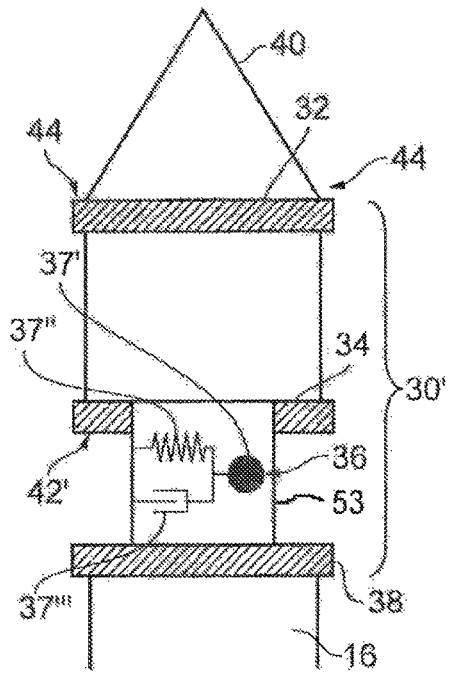
FIGS. 6A and 6B each show a schematic illustration of a further load-handling means according to the invention.
Figure 6B:
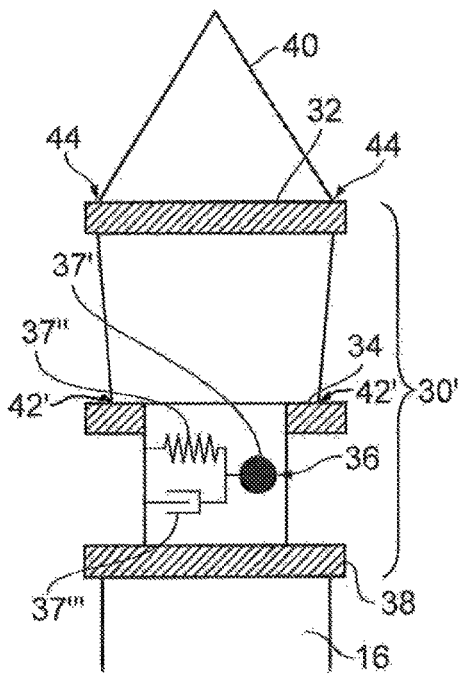

FIG. 6A shows an alternative exemplary embodiment of a load-handling means 30' according to the invention, which load-handling means 30 has in turn a spreader 32, an upper lifting frame 34, a lower lifting frame 38 and an oscillation damper 36 between them. In contrast to the exemplary embodiment according to FIG. 5A, the anchoring means 40 is attached at attachment points 42' in the upper lifting frame 34. The spreader 32 has anchoring points 44 which can in turn be offset with respect to the attachment points 42' (e.g., as shown in FIG. 6B). The lower lifting frame 38 is itself not connected directly to the anchoring means 40 but bears the tower or the tower segment 16 under said lower lifting frame 38. Structural load-bearing connections (which are not illustrated in FIG. 6A) can be present between the upper lifting frame and the lower lifting frame 38. Alternatively or additionally, the housing 53 of the oscillation damper can be part of the load-bearing structure between the upper lifting frame 34 and the lower lifting frame 36.

The oscillation damper 36 can either be a fixed component of the load-handling means 30 or can be embodied in such a way that it can be connected thereto, in particular in an exchangeable fashion. It is therefore possible, for example, to keep available a relatively large number of load-handling means which are designed to hold an oscillation damper, and to keep available a relatively small number of oscillation dampers. The tower sections or towers which are, for example, to be installed offshore can then already be equipped with the load-handling means at the port, which load-handling means are then only equipped with an oscillation damper in situ on the wind turbine installation vessel or on a wind turbine installation platform.

Figure 7:
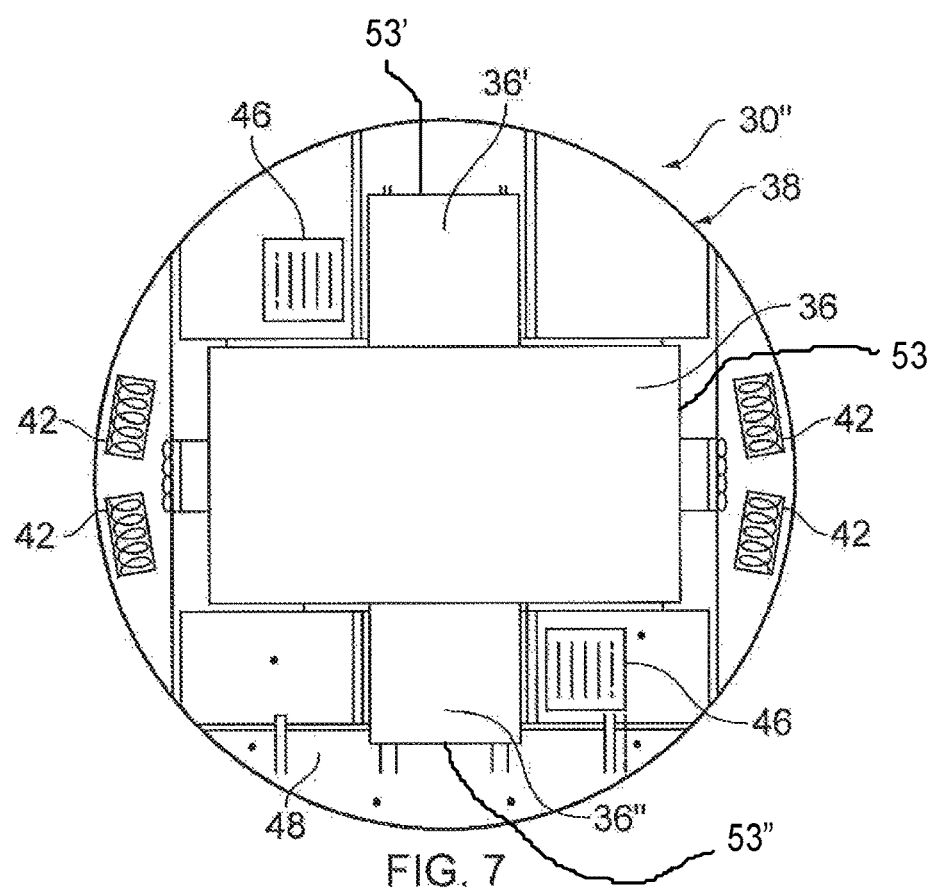
FIG. 7 shows a plan view of a load-handling means according to the invention in a schematic illustration.

FIG. 7 shows possible embodiment of an alternative load-handling means 30 according to the invention in a circular design in a schematic plan view. Three oscillation dampers 36, 36' and 36" are shown centrally and they are dimensioned differently and therefore also have different damping frequencies. As was already the case in FIGS. 4 to 6A, the oscillation dampers 36, 36', 36" can also be embodied as liquid dampers, as mass-spring dampers or as pendulum dampers in FIG. 7. Owing to the rather low available overall height of one meter or several meters, mass-spring dampers or liquid dampers, that is to say tuned liquid sloshing dampers or TLCDs, are particularly appropriate. There would under certain circumstances also be space in the tower for a pendulum damper, i.e. the pendulum damper would project out of the load-handling means into the tower. However, this space is limited at the latest by the uppermost bulkhead in the tower, which bulkhead is usually arranged a meter or somewhat more underneath the upper edge of the tower.

FIG. 7 shows a lower lifting frame 38 of the load-handling means 30", which is also embodied as a cover 48 or has a cover 48 and therefore closes off the tower 16 or the tower section 14 below it in a way which is weatherproof, in particular rainproof. Arranged in the cover 48 are two tower hatches 46 which permit entry into the tower 14. Attachment points 42 for anchoring means of a lifting gear unit are respectively arranged on the circumference of the lifting frame 38. The rigidity of the lifting frame 38 causes the forces which could act in a compressive fashion on the cross section of the tower to be absorbed by the lifting frame 38, with the result that the cross section of the tower or of the tower section is not compressed or deformed. In addition, the spreader 32 which is shown in FIGS. 5A and 6A also has a compensating effect in this respect.

All the specified features, also those features which can be found solely in the drawings as well as individual features which are disclosed in combination with other features, are considered to be essential to the invention both alone and in combination. Embodiments according to the invention can also be implemented by means of single features or a combination of a plurality of features. Features which are characterized by "in particular" or "preferably" are to be understood as being optional features within the scope of the invention.

LIST OF REFERENCE NUMBERS IN DRAWING FIGURES

The following reference numbers appear in the drawing figures:
2 Base
10 Wind turbine
12 Foundation
14 Tower
16 Tower section
20 Nacelle
22 Rotor hub
24 Spinner
26 Rotor blade
30, 30', 30" Load-handling means
32 Spreader
34 Upper lifting frame
36, 36', 36" Oscillation damper
37' Mass
37" Spring
37'" Damping element
38 Lower lifting frame
40 Anchoring means
42, 42' Attachment point
44 Anchoring point
46 Tower hatch
48 Cover
50 Lifting gear (unit)
52 Load-bearing means

What is claimed is:

1. A load-handling means configured for releasable attachment to a tower or a tower section during construction of a wind turbine, said load-handling means comprising:
   attachment points for releasably attaching at least one anchoring means of a lifting gear unit to the load-handling means; and
   at least one oscillation damper;
   wherein said at least one oscillation damper is fixedly attached to the load-handling means or is releasably and/or exchangeably attached to the load-handling means,
   wherein said at least one oscillation damper has a damping frequency for effecting damping of a natural frequency of the tower or tower section when the tower or tower section is clamped or freestanding and awaiting attachment of a gondola during the construction of the wind turbine, and
   wherein the load-handling means is configured for removal from the tower or tower section to allow for attachment of the gondola during construction of the wind turbine.

2. The load-handling means as claimed in claim 1, wherein the at least one oscillation damper is a tuned liquid sloshing damper, a tuned liquid column damper (TLCD), a pendulum damper with or without a viscous liquid, or a spring-mass damper.

3. The load-handling means as claimed in claim 1, wherein the load-handling means comprises a plurality of oscillation dampers with different damping frequencies.

4. The load-handling means as claimed in claim 3, wherein the damping frequency of each of the plurality of oscillation dampers lies between 0.2 and 1.5 Hz.

5. The load-handling means as claimed in claim 3, wherein the damping frequency of each of the plurality of oscillation dampers lies between 0.5 and 1.0 Hz.

6. The load-handling means as claimed in claim 3, wherein the plurality of oscillation dampers are arranged in an exchangeable fashion between an upper lifting frame and a lower lifting frame, or wherein the plurality of oscillation dampers are connected in a fixed fashion to a single lifting frame.

7. The load-handling means as claimed in claim 6, wherein a housing of the plurality of oscillation dampers is a load-bearing part of the load-handling means.

8. The load-handling means as claimed in claim 1, wherein the damping frequency of the at least one oscillation damper lies between 0.2 and 1.5 Hz.

9. The load-handling means as claimed in claim 1, wherein the damping frequency of the at least one oscillation damper lies between 0.5 and 1.0 Hz.

10. The load-handling means as claimed in claim 1, wherein the damping frequency of the at least one oscillation damper can be adapted to various transportation states, construction states, towers and/or tower sections.

11. The load-handling means as claimed in claim 1, wherein the oscillation damper is arranged in an exchangeable fashion between an upper lifting frame and a lower lifting frame, or wherein the oscillation damper is connected in a fixed fashion to a single lifting frame.

12. The load-handling means as claimed in claim 11, wherein a housing of the at least one oscillation damper is a load-bearing part of the load-handling means.

13. The load-handling means as claimed in claim 11, wherein the upper lifting frame has attachment points for the at least one anchoring means, or wherein the upper lifting frame has anchoring points, and the lower lifting frame has attachment points for the at least one anchoring means, and wherein the anchoring points and the attachment points are arranged offset with respect to each other.

14. The load-handling means as claimed in claim 1, wherein at least part of the load-handling means is a cover for the tower or the tower section and has at least one tower hatch for access to an interior of the tower or the tower section.

* * * * *